2,901,333

METHOD FOR PREPARING SODIUM BOROHYDRIDE

Robert W. Bragdon, Marblehead, Mass., assignor to Metal Hydrides Incorporated, Beverly, Mass., a corporation of Massachusetts No Drawing. Application July 11, 1956
Serial No. 597,100

1 Claim. (Cl. 23—296)

This invention relates to the preparation of sodium borohydride and particularly to the recovery of sodium borohydride from aqueous solutions of sodium borohydride and sodium hydroxide.

Sodium borohydride may be prepared by the reaction of sodium hydride with methyl borate to form a reaction mixture of sodium borohydride and sodium methoxide as illustrated by the equation:

$$4NaH + B(OCH_3)_3 \rightarrow NaBH_4 + 3NaOCH_3 \qquad (1)$$

It is presently preferred to employ sodium hydride in the form of a finely divided dispersion of the sodium hydride in a white mineral oil. The reaction mixture thus obtained consists of a fine dispersion of solid reaction products in the mineral oil. If sufficient water is added to this dispersion to dissolve the solid reaction products, the solution may be separated easily from the oil. When the reaction mixture is dissolved in water, the sodium methoxide is converted to sodium hydroxide and methanol. Excess sodium hydride is converted to sodium hydroxide and hydrogen. The solution thus formed consists of water and methanol containing sodium hydroxide and sodium borohydride dissolved therein.

One method for isolating sodium borohydride from the above mentioned solution is described in the copending application of Edward R. Winiarczyk Serial No. 566,352, filed February 20, 1956, now abandoned. As described in that application, it is preferable first to remove the methanol from the solution to form a liquor consisting essentially of a water solution of sodium hydroxide and sodium borohydride. This liquor then may be agitated with isopropylamine or other solvent for sodium borohydride which is substantially immiscible with the liquor. When this mixture is permitted to settle two separate layers are formed, namely, (1) a solution of sodium borohydride dihydrate in isopropylamine and (2) an aqueous solution of sodium hydroxide. Anhydrous sodium borohydride may be recovered from the isopropylamine solution by vacuum evaporation.

In the copending application of James B. Vetrano and Robert W. Bragdon Serial No. 504,676, filed April 28, 1955, now Patent No. 2,856,676, a method has been described for obtaining anhydrous sodium borohydride by crystallization from a water solution containing a predetermined amount of sodium hydroxide, such as about 15 to 17 percent by weight. The solution is heated to a temperature substantially greater than a predetermined lower crystallization temperature and its sodium borohydride content is increased to an amount greater than is required to render the solution saturated at the predetermined crystallization temperature. The solution then is cooled to the predetermined crystallization temperature thereby causing crystals of anhydrous sodium borohydride to form. These crystals may be separated from the mother liquor in any desired manner as by a centrifuge.

The present invention particularly contemplates a method for recovering sodium borohydride from a solution obtained by treating the previously described reaction mixture of sodium borohydride and sodium methoxide to dissolve the same and form a solution of water and methanol containing sodium borohydride and sodium hydroxide. Simple fractional crystallization of sodium borohydride from such a liquor after removal of the methanol has proved impractical because the invariant composition at which the solution is saturated with respect to both sodium hydroxide and sodium borohydride does not change significantly with temperature. Consequently, it is necessary to change the ratio of the amount of sodium hydroxide to the amount of sodium borohydride in this liquor to make possible the recovery of sodium borohydride therefrom by fractional crystallization.

In this specification and the appended claims a solution of sodium borohydride and sodium hydroxide is referred to as having an invariant composition or invariant ratio of sodium borohydride to sodium hydroxide if, when the solution is subjected to vacuum evaporation or cooling or both to cause a precipitate to form and the precipitate is removed, the remaining solution contains sodium hydroxide and sodium borohydride in the same ratio by weight as the original solution.

The method of the present invention utilizes the discovery that a solution of sodium hydroxide and sodium borohydride in water can be treated with methanol to cause selective precipitation of sodium hydroxide provided the combined amount of sodium hydroxide and sodium borohydride by weight in the solution is not less than a minimum concentration which varies directly with the temperature at which the precipitation and separation of the sodium hydroxide is conducted. Thus, it has been discovered that sodium hydroxide can be selectively precipitated by the addition of an effective amount of methanol to a water solution in which the combined amount of sodium borohydride and sodium hydroxide and the amount of water is such that the concentration of the solution ranges from a solution which is substantially saturated with sodium borohydride and sodium hydroxide to a diluted solution in which the presence of not less than about 5 percent by weight of methanol causes precipitation of sodium hydroxide. The minimum amount of methanol required to cause some precipitation of sodium hydroxide from such solutions varies with the concentration of the solution and to some extent with its temperature from a small fraction of 1 percent in the case of a saturated solution to about 5 percent by weight in the case of the most diluted solution. As the amount of methanol is increased a maximum amount is reached which causes the sodium hydroxide to redissolve. This maximum amount varies with the concentration of the solution and its temperature. In the case of the saturated solutions the maximum amounts vary substantially directly at the rate of about 1 percent by weight for each 4° C. increase in temperature between about 25° C. and about 60° C. and is about 37 percent by weight at 25° C. The maximum amount of methanol useable decreases at a given temperature between about 25° C. and about 60° C. at the rate of about 2 percent by weight for each addition of 1 percent by weight of water to the saturated solution. The sodium hydroxide precipitate obtained in this manner contains both water and methanol of crystallization.

The method of the present invention contemplates the recovery of sodium borohydride from an aqueous solution having a substantially invariant ratio of sodium hydroxide to sodium borohydride and wherein the combined amount of sodium borohydride and sodium hydroxide and the amount of water is such that the concentration of the solution ranges from a solution substantially saturated with sodium borohydride and sodium hydroxide to a diluted solution in which the presence of not less than about 5 percent by weight of methanol causes precipitation of sodium hydroxide. In accordance with the method of the present invention sodium hydroxide and sodium borohydride are alternately precipitated and separately recovered from solutions of the above compositions, precipitation of sodium hydroxide being effected by the presence in the solution of an effective amount of methanol and precipitation of sodium borohydride then being effected by subjecting the solution to vacuum evaporation. By selectively precipitating and removing sodium hydroxide from the solution the invariant ratio of sodium borohydride to sodium hydroxide is changed so that sodium borohydride may be recovered from the solution by fractional crystallization. The water solution of the above mentioned reaction mixture of sodium borohydride and sodium methoxide, after removal of methanol, falls within the above defined compositions which may be treated by the method of the invention, that is, the combined amounts of sodium borohydride and sodium hydroxide are between about 54.0 and 59.5 percent by weight at 25° C. The previously mentioned minimum and maximum amounts of methanol which are useable are of importance only for the purpose of defining the limits of the amount of methanol which may be used in the practice of the invention since in practice the practical amount used at any given concentration of the solution and temperature thereof is substantially greater and less respectively.

In accordance with one illustrative practice of the invention the previously described reaction mixture of sodium borohydride and sodium methoxide is dissolved in water to form a solution of sodium borohydride and sodium hydroxide in water and methanol. This solution then is subjected to vacuum distillation to remove methanol and, if necessary, some water to obtain an aqueous solution which is substantially saturated with sodium borohydride and sodium hydroxide. Methanol is added to this saturated solution to cause precipitation of sodium hydroxide crystals. After cooling, if desired, the crystals may be removed by centrifuging or filtration. The ratio of sodium borohydride to sodium hydroxide in the filtrate from this procedure is greater than in the original solution. The above mentioned filtrate is subjected to vacuum distillation to remove methanol and some water and cause anhydrous sodium borohydride to crystallize out. By cooling the liquor to normal room temperature or lower additional anhydrous sodium borohydride will crystallize out. The cycle of alternately precipitating and separately recovering sodium hydroxide and anhydrous sodium borohydride by adding methanol to the liquor and then subjecting the solution, from which the precipitated sodium hydroxide has been separated, to vacuum evaporation to crystallize and separate anhydrous sodium borohydride may be repeated.

The permissible minimum concentration of sodium hydroxide in the solution from which crystals of sodium borohydride are obtained varies depending upon the temperature to which the solution is cooled for crystallization if anhydrous crystals are desired. Thus, the minimum permissible sodium hydroxide concentration varies directly between 12 and 22 percent by weight as the crystallization temperature is decreased from about 25° C. to 0° C.

As indicated above, when the previously described reaction mixture of sodium borohydride and sodium methoxide is dissolved in water a solution of sodium borohydride and sodium hydroxide in water and methanol is formed. In the practice of the invention the methanol present in this solution may be utilized for the partial precipitation of sodium hydroxide. The following is a possible cycle of operation in which the compositions of solutions are calculated upon the basis of known solubility relationships at 25° C. and the assumptions that the composition of the sodium hydroxide precipitate is $3NaOH \cdot 2H_2O \cdot CH_3OH$ and that the precipitates are completely freed of liquors during centrifugation. Such a solution containing 24 grams of sodium borohydride, 81 grams of sodium hydroxide, 61 grams of methanol and 87 grams of water is added to a mother liquor containing 84 grams of sodium borohydride, 270 grams of sodium hydroxide and 246 grams of water. To this mixture is added 171 grams of methanol to give a mixture of solution and crystals. This reaction mixture is filtered or centrifuged to remove crystals of sodium hydroxide containing water and methanol of crystallization. The filtrate containing 108 grams of sodium borohydride, 270 grams of sodium hydroxide, 210 grams of methanol and 308 grams of water is vacuum evaporated to remove the methanol and 62 grams of water and to precipitate 24 grams of sodium borohydride. The resulting mixture is centrifuged to recover pure anhydrous sodium borohydride and a filtrate containing 84 grams of sodium borohydride, 270 grams of sodium hydroxide and 246 grams of water which can be used as the mother liquor for another cycle of operation.

While the invention contemplates a method for recovering sodium borohydride from a recation mixture of sodium borohydride and sodium methoxide prepared by reacting sodium hydride with methyl borate as illustrated by Equation 1 above, it is not limited to this method for preparing the reaction mixture. This reaction mixture may be prepared by reacting sodium hydride with sodium trimethoxyborohydride as illustrated by the equation:

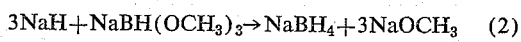

$$3NaH + NaBH(OCH_3)_3 \rightarrow NaBH_4 + 3NaOCH_3 \quad (2)$$

The invention is illustrated further by the following specific example. A solution of sodium borohydride and sodium hydroxide in water was prepared by dissolving 1380 grams of sodium hydroxide pellets and 428 grams of sodium borohydride in 1200 grams of water. Analysis indicated that the filtered solution contained 14.0 percent sodium borohydride and 45.2 percent sodium hydroxide by weight and, therefore, was substantially saturated with these compounds.

602.8 grams of methanol was added to 2000 grams of the above solution while stirring over the course of twenty to thirty minutes to obtain a mixture containing about 23.1 percent methanol by weight. The solution was cooled in a water bath during the addition of the methanol to prevent the temperature from exceeding 50° C. Precipitation of a considerable portion of the sodium hydroxide as small crystals occurred. The reaction mixture was cooled to 25° C. and the crystals were separated by a basket centrifuge (International No. 450) lined with a nyoln filter cloth. 416.9 grams of crystals were recovered and, without being washed, were dried in a vacuum oven at 80° to 100° C. for several hours. The dried crystals weighed 256.7 grams and contained 91.6 percent sodium hydroxide, 4.8 percent sodium borohydride and 1.3 percent methanol by weight.

1652 grams of the filtrate were recovered and was found to contain 12.5 percent sodium borohydride, 32.2 percent sodium hydroxide, 16.5 percent methanol and 38.8 percent water by weight. This solution was concentrated by vacuum distillation to remove the methanol and some of the water. A total of 455.3 grams of methanol and water were removed in this manner. The solution was then cooled to 25° C. and crystals of sodium borohydride formed. These crystals were collected in the basket centrifuge and were washed in the basket with a fine spray of 31.9 grams of methanol. The washed crystals weighed 52.9 grams. A portion of the crystals were dried in a vacuum oven at 80° to 100° C. for several hours. The dried product assayed 95.1 percent sodium borohydride by weight.

The filtrate contained 45.4 percent sodium hydroxide and 15.2 percent sodium borohydride by weight which is substantially the same as the starting solution.

I claim:

The method for recovering sodium borohydride from a water solution having an invariant ratio of sodium borohydride to sodium hydroxide and which is substantially saturated with these components at a temperature of about 25° C. which comprises adding methanol to said solution to obtain a mixture containing about 23 percent by weight of methanol, cooling the mixture to a temperature of about 25° C. to precipitate sodium hydroxide, removing the precipitated sodium hydroxide from the cooled mixture to obtain a liquor containing in solution most of the sodium borohydride content of the original solution, subjecting said liquor to vacuum distillation followed by cooling the liquor to a temperature of about 25° C. to precipitate solid sodium borohydride, and separating the solid sodium borohydride.

References Cited in the file of this patent

UNITED STATES PATENTS

| | | |
|---|---|---|
| 2,418,372 | Smith | Apr. 1, 1947 |
| 2,542,746 | Banus et al. | Feb. 20, 1951 |
| 2,729,540 | Fisher | Jan. 3, 1956 |

FOREIGN PATENTS

| | | |
|---|---|---|
| 717,451 | Great Britain | Oct. 27, 1954 |

OTHER REFERENCES

Technique of Organic Chemistry, vol. III, edited by A. Weissberger. Published by Interscience Publishers, Inc., N.Y. (1950), pp. 172, 295 and 296.